Figure 1:
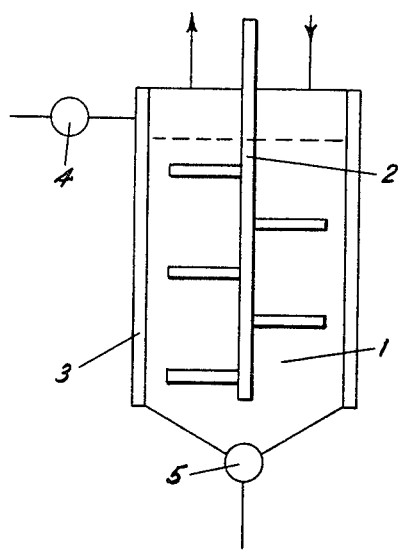

Jan. 11, 1966  P. A. SMALL ETAL  3,228,759
POLYMERIZATION OF LACTAMS WITH VOLATILE PROMOTERS
Filed Feb. 23, 1962

INVENTORS
PERCY ARTHUR SMALL
ERNO LASZLO ZICHY

BY Cushman, Darby & Cushman
ATTORNEYS

United States Patent Office 3,228,759
Patented Jan. 11, 1966

3,228,759
ANIONIC POLYMERIZATION OF LACTAMS WITH VOLATILE PROMOTERS
Percy Arthur Small and Erno Laszlo Zichy, both of Welwyn Garden City, England, assignors to Imperial Chemical Industries Limited, London, England, a corporation of Great Britain
Filed Feb. 23, 1962, Ser. No. 175,223
Claims priority, application Great Britain, Feb. 23, 1961, 6,694/61
7 Claims. (Cl. 51—298)

This invention relates to an improved polymerisation process whereby polyamide-forming lactams may be converted into solid products.

It has been proposed to polymerise cyclic lactams having at least six carbon atoms in the ring by heating the monomer at a temperature above its melting point in the presence, as polymerisation catalysts, of alkali or alkaline earth metals or their alkaline reacting compounds. It is known that the alkaline polymerisation of lactams is inhibited by oxygen and water and it is necessary to remove these substances as completely as possible from the polymerising mixture. Polymerisation is therefore normally conducted after purging the components of the mixture with a dry inert gas such as nitrogen or argon. It has also been proposed to accelerate the alkaline polymerisation of lactams by carrying it out in the presence of organic compounds known in the art as promoters. These promoters greatly increase the rate of polymerisation. They even enable the polymerisation to proceed at a reasonably fast reaction rate at temperatures below the softening point of the polymer corresponding to the lactam employed and to go substantially to equilibrium at these temperatures. This results in the production of polymer containing much smaller proportions of residual monomer than polymer produced above its softening point, and consequently in polymer having better physical properties. Their utility is not confined, however, to polymerisations below the polymer softening point. Methods disclosed for bringing together the components of the polymerisation mixture comprise dissolving the alkaline material in molten lactam and thereafter adding the organic promoter either as such or dissolved in a further quantity of lactam. Such two-stage methods of incorporating the components are tedious and time-consuming particularly as they are desirably carried out under oxygen- and moisture-free conditions. It may also be difficult to ensure that the promoter, which is used in relatively small concentrations, is uniformly distributed through the polymerisable mixture. Poor dispersion of promoter tends to cause local "hot-spots" which in turn produce a polymer with inferior properties.

It is an object of this invention to provide an improved polymerisation process for cyclic lactams. A specific object is to provide a process for polymerising cyclic lactams which is simple to operate and is particularly adapted to continuous operation. Another object is to provide a process in which the components of the polymerisable mixture are relatively easily dispersed in each other in a uniform manner. Other objects will appear hereinafter.

Accordingly we provide a process for the alkaline polymerisation of monomeric cyclic lactams having at least six carbon atoms in the ring, wherein a promoter for said alkaline polymerisation reaction is brought into contact with the molten lactam containing dissolved alkaline catalyst, and in which said promoter is an organic compound which is in the vapour state when it is brought into contact with said lactam.

Suitable lactams which may be employed in our process include caprolactam, enantholactam, capryllactam dodecanolactam and their C-substituted derivatives, such as α-methylcaprolactam, β,δ-dimethylcaprolactam and β-phenyl-caprolactam, and mixtures of any of the above lactams.

A very convenient method of introducing the vapour of the organic promoter is to entrain it in a stream of inert gas such as nitrogen which is passed over the polymerisable melt. The inert gas stream is normally unheated before entering the polymerisation zone and is either at atmospheric pressure or slightly above atmospheric pressure, e.g., up to about 2 atmospheres. This method of working is especially suitable for continuous operation. It also has the advantage that the quantity of organic promoter being metered into the polymerisation zone may be accurately controlled, by controlling the gas flow and the partial pressure of the promoter in the gas.

The alkaline polymerisation of cyclic lactams is normally carried out at temperatures above about 150° C. Suitable catalysts are the alkali and alkaline earth metals (e.g., sodium, potassium, lithium, calcium, strontium, barium, magnesium) either in metallic form or in the form of hydrides, complex hydrides, oxides, hydroxides, alkoxides, carbonates etc. When compounds which would evolve water or primary or secondary alcohols under polymerisation conditions such as oxides, hydroxides, alkoxides, and carbonates are used, all or substantially all of such water or alcohol should first be removed by the application of heat and/or reduced pressures. Other effective catalysts are the organo-metallic derivatives of the above metals, e.g. lithium hydrocarbon derivatives such as lithium alkyls and lithium aryls, and the materials commonly known as Grignard reagents, e.g., ethyl magnesium chloride, methyl magnesium bromide, phenyl magnesium bromide and the like. The catalyst may be used in concentrations ranging from about 0.01 to 10% by weight of the lactam. The amount of catalyst to be used depends both on its nature, especially on its equivalent weight as a base, and on the desired molecular weight of the polymer, since the molecular weight decreases as the amount of catalyst used increases. Suitable amounts of catalyst will normally lie in the range of from 0.05 to 2% by weight of the lactam.

Examples of organic compounds which act as promoters of the alkaline polymerisation reaction and can readily be used in our process on account of their relatively low boiling points are dimethyl carbonate, diethyl carbonate, other dialkyl carbonates containing not more than 4 carbon atoms in each alkyl group, ketene, dimethyl ketene, acetic anhydride, propanoic anhydride, butanoic anhydride, methyl isocyanate, ethyl isocyanate, propyl isocyanate, butyl isocyanate, phenyl isocyanate, N-methyl urethane, N-ethyl urethane, acetyl chloride, propyl chloride and butyryl chloride. We prefer to use those promoters which do not react too rapidly with traces of water, e.g., lower alkyl carbonates and urethanes. Preferably, in order to obtain polymers having relatively low monomer contents, the polymerisation should be effected at a temperature below the polymer softening point. Suitable amounts of accelerator that may be used range from about 0.0001 to 5.0%, preferably from 0.01 to 0.5% based on the weight of the lactam.

Suitable apparatus for carrying out the process of our invention in a continuous manner is illustrated diagrammatically in FIGURE 1 of the accompanying drawings which is a view in elevation. A polymerisation vessel 1 is provided with a slowly running stirrer 2 and a heating jacket 3. Metering pump 4 is adapted to deliver molten catalysed lactam, normally caprolactam, to vessel 1. Another metering pump 5 at the outlet of vessel 1 removes the molten polymer therefrom. An inert gas (nitrogen) is fed into the top of vessel 1 as shown by the arrow to maintain an atmosphere of inert gas above the melt in vessel 1, the level of said melt (indicated by the dotted line in the drawing) being controlled by means not shown. In operating this apparatus in accordance with the present invention, a volatile organic promoter is entrained in the nitrogen stream and is thereby brought into contact with the surface of the melt in vessel 1. The catalysed monomer is preferably pre-heated to about 170–180° C. before entering vessel 1. To start the reaction, heat is applied through jacket 3, but when the reaction has reached a steady state little or no heat need be supplied, as the heat of polymerisation is sufficient to raise the temperature to about 230° C., i.e., above the softening point of polycaprolactam (215° C.).

Another application of the process of our invention is in the production of centrifugally cast tubes by a process which comprises rotating a cylindrical mould about its longitudinal axis while said axis is horizontal, said mould containing an amount which is insufficient to fill it of a molten lactam containing dissolved alkaline catalyst, introducing a volatile organic promoter above the surface of the melt in the rotating mould, and discontinuing said rotation when a solid tube has been formed. The promoter is conveniently introduced into the mould in a stream of inert gas such as nitrogen. In order to produce tubes which have a particularly low void content and which are substantially free from internal strains it is preferred to carry out the polymerisation in said rotating mould at a temperature below the softening point of the polymer.

If desired, however, at least part of the polymerisation may be effected above the softening point of the polymer, preferably not more than about 40° C. above it for a short period. For instance, the polymerisation may be initiated at a temperature below the polymer softening point and thereafter the temperature may be allowed to rise above it as a result of the exothermic nature of the reaction, for example by using a rotating tube which has been pre-heated to a temperature a few degrees centigrade below the polymer softening point. After the polymerisation reaction has been completed, the temperature must be lowered below the softening point of the polymer while the tube is still in rotation in order to produce the desired article.

Figure 2:
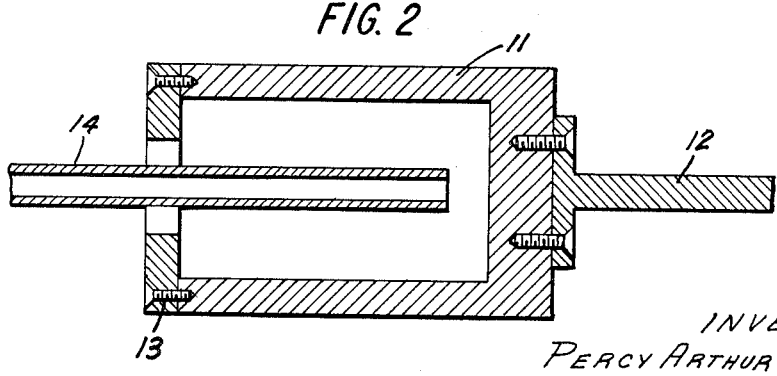

One suitable form of apparatus for making tubes according to our invention is illustrated diagrammatically in FIGURE 2 of the accompanying drawings which is a mid-sectional elevation. 11 is a mould completely closed at one end to which is fixed a central rotatable shaft 12. The other end is partially closed by an annular disc 13 through the centre of which passes a pipe 14 for the introduction of the inert gas containing the promoter.

The amount of material introduced into the mould will, of course, determine the thickness of the final article. Tubes of from about ⅛th in. to 1 in. wall thickness and from about 2 in. to 24 in. diameter may be conveniently made by our process, in lengths of up to 6 feet. They are very suitable for conveying liquids and gases, e.g., petroleum products, natural gas and coal gas.

If desired, the melt to be polymerised may be mixed with inert filling material, e.g., short length glass fibres or abrasive powder. When glass fibres are used they are preferably present in amounts of between 5 and 40% by weight of the total weight of the solid article produced. Grinding wheels may be conveniently made by incorporating, e.g., carborundum, preferably in amounts of between about 60 and 85% by weight of the solid article produced.

Our invention is illustrated but in no way limited by the following example in which all parts given are by weight.

Five parts of potassium tertiary butoxide were added to 1,000 parts of caprolactam and the mixture was melted by heating to 100° C. while passing a stream of nitrogen through it. The melt was introduced into an apparatus as illustrated in FIGURE 2 of the accompanying drawings, the mould 11 having been preheated to 175° C. Nitrogen was passed at a rate of 800 ml. per minute through pipe 14 into the mould which was rotated at 240 revolutions per minute. Ten parts of diethylcarbonate were evaporated into this nitrogen stream before it entered the mould at a rate of 3 parts per minute. When 15 minutes had elapsed after the evaporation of all the diethyl carbonate, the mould and its contents were slowly cooled to room temperature, the rotation and the nitrogen streams were terminated, the annular disc 13 removed, and a solid tube withdrawn from the mould. The product, on analysis, was found to be 98.5% by weight of polymer.

We claim:
1. A process for the alkaline polymerization of monomer cyclic lactams of monoamino monocarboxylic acids containing from 6 to 12 carbon atoms and having at least six carbon atoms in the lactam ring which comprises entraining, in a stream of inert gas, a volatile promoter selected from the class consisting of dialkyl carbonates containing not more than 4 carbon atoms in each alkyl group, ketene, dimethyl ketene, acetic anhydride, propanoic anhydride, butanoic anhydride, methyl isocyanate, ethyl isocyanate, propyl isocyanate, butyl isocyanate, phenyl isocyanate, N-methyl urethane, N-ethyl urethane, acetyl chloride, propyl chloride and butyryl chloride, passing said inert gas containing entrained promoter over a melt of the anhydrous lactam containing dissolved alkaline catalyst, the promoter being in the vapor state when it contacts said melt and the polymerization being carried out at a temperature in the range of from 150° C. to a temperature which is 40° C. above the softening point of the polymerized lactam.

2. A process according to claim 1 in which said temperature is below the softening point of the polymerized lactam.

3. A process as set forth in claim 1 in which the amount of promoter used is in the range of from 0.01 to 0.5% based on the weight of said lactam.

4. A process as set forth in claim 1 for the production of centrifugally cast tubes of polyamides which comprises rotating a cylindrical mold about its longitudinal axis while said axis is horizontal, said mold containing an amount which is insufficient to fill it of the molten lactam containing dissolved alkaline catalyst, introducing said inert gas, containing entrained promoter, above the surface of the melt in the rotating mold and discontinuing said rotation when a solid tube has been formed.

5. A process according to claim 4 wherein the melt is polymerized in admixture with inert filling material.

6. A process according to claim 5 wherein said filling material comprises short length glass fibers.

7. A process according to claim 5 wherein said filling material comprises abrasive powder.

References Cited by the Examiner
UNITED STATES PATENTS

| | | | |
|---|---|---|---|
| 2,241,321 | 5/1941 | Schlack | 260—78 |
| 2,907,755 | 10/1959 | Lautenschlager et al. | 260—78 |
| 3,017,391 | 1/1962 | Mottus et al. | 260—78 |
| 3,028,369 | 4/1962 | Butler et al. | 260—78 |

FOREIGN PATENTS 1,067,587  10/1959  Germany.

WILLIAM H. SHORT, *Primary Examiner.*

LOUISE P. QUAST, *Examiner.*